(12) United States Patent
Uchihara et al.

(10) Patent No.: US 9,705,410 B2
(45) Date of Patent: Jul. 11, 2017

(54) POWER CONVERSION APPARATUS

(71) Applicant: TOYOTA JIDOSHA KABUSHIKI KAISHA, Toyota-shi, Aichi-ken (JP)

(72) Inventors: Masafumi Uchihara, Toyota (JP); Kazuyuki Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/946,383

(22) Filed: Nov. 19, 2015

(65) Prior Publication Data

US 2016/0211758 A1 Jul. 21, 2016

(30) Foreign Application Priority Data

Jan. 15, 2015 (JP) ................. 2015-005961

(51) Int. Cl.

| | |
|---|---|
| H02J 1/10 | (2006.01) |
| H02M 3/24 | (2006.01) |
| H02M 5/42 | (2006.01) |
| H02M 7/04 | (2006.01) |
| H02M 7/68 | (2006.01) |
| H02M 7/757 | (2006.01) |
| H02M 7/5387 | (2007.01) |
| H02M 7/521 | (2006.01) |

(Continued)

(52) U.S. Cl.
CPC ... *H02M 3/33546* (2013.01); *H02M 3/33561* (2013.01); *H02M 3/33584* (2013.01); *H02M 2001/0048* (2013.01); *Y02B 70/1491* (2013.01)

(58) Field of Classification Search
CPC ............. H02M 3/157; H02M 3/33515; H02M 3/33523; H02M 3/33569; H02M 3/33576; H02M 2001/0012; H02M 2001/0038; H02M 2001/0067; H02M 1/088
USPC ................ 363/17, 65, 76–79, 124, 132, 136
See application file for complete search history.

(56) References Cited

U.S. PATENT DOCUMENTS

| | | | |
|---|---|---|---|
| 2005/0083714 A1* | 4/2005 | Zhu | ................... H02M 3/33576 363/17 |
| 2011/0198933 A1* | 8/2011 | Ishigaki | ................. B60R 25/00 307/66 |

(Continued)

FOREIGN PATENT DOCUMENTS

| | | |
|---|---|---|
| JP | 2009-281774 A | 12/2009 |
| JP | 2011-193713 A | 9/2011 |
| JP | 2014-187729 A | 10/2014 |

*Primary Examiner* — Adolf Berhane
*Assistant Examiner* — Gary Nash
(74) *Attorney, Agent, or Firm* — Oliff PLC (57) ABSTRACT

Phase differences between primary-side series-connected first and second arms and secondary-side series-connected fifth and sixth arms and between primary-side series-connected third and fourth arms and secondary-side series-connected seventh and eighth arms are controlled for power being transmitted from the secondary side to the primary side. Turn-off of the fifth arm is corrected to cause an integrating result of a secondary coil current for an interval delayed by a current sensor response delay from an interval between turn-off of the first arm and turn-on of the seventh arm to approach zero, or turn-off of the seventh arm is corrected to cause an integrating result of the secondary coil current for an interval delayed by the response delay from an interval between turn-off of the third arm and turn-on of the fifth arm to approach zero.

16 Claims, 9 Drawing Sheets

(51) Int. Cl.
*H02M 3/335* (2006.01)
*H02M 1/00* (2006.01)

(56) References Cited

U.S. PATENT DOCUMENTS

2013/0301304 A1* 11/2013 Murakami ............ H02M 3/335
  363/17
2014/0286055 A1* 9/2014 Takagi .............. H02M 3/33584
  363/17

* cited by examiner

FIG.9 ions of respective arms S1 to S8 shown in FIG. 1. In the
POWER CONVERSION APPARATUS

BACKGROUND OF THE INVENTION

1. Field of the Invention

The present invention relates to a power conversion apparatus.

2. Description of the Related Art

In the related art, a power conversion apparatus is known which includes a transformer having a primary coil and a secondary coil, a primary-side full bridge circuit where a bridge part includes the primary coil of the transformer, and a secondary-side full bridge circuit where a bridge part includes the secondary coil of the transformer (for example, see Japanese Laid-Open Patent Application No. 2011-193713). Each of the primary-side full bridge circuit and the secondary-side full bridge circuit has a pair of arm circuits each of which has respective arms at a high side and a low side. In the power conversion apparatus, the phase difference between switching of the primary-side full bridge circuit and switching of the secondary-side full bridge circuit is controlled in such a manner that power is transmitted between the primary-side full bridge circuit and the secondary-side full bridge circuit.

SUMMARY OF THE INVENTION

According to one aspect of the present invention, a power conversion apparatus includes a transformer having a primary coil and a secondary coil; a primary-side full bridge circuit having a first arm circuit where a first arm at a high side and a second arm at a low side are connected in series and a second arm circuit where a third arm at a high side and a fourth arm at a low side are connected in series, the primary coil being included in a bridge part that connects a connected point at which the first arm and the second arm are connected with a connected point at which the third arm and the fourth arm are connected; a secondary-side full bridge circuit having a third arm circuit where a fifth arm at a high side and a sixth arm at a low side are connected in series and a fourth arm circuit where a seventh arm at a high side and an eighth arm at a low side are connected in series, the secondary coil being included in a bridge part that connects a connected point at which the fifth arm and the sixth arm are connected with a connected point at which the seventh arm and the eighth arm are connected; a control part controlling a first phase difference between switching of the first arm circuit and switching of the third arm circuit and a second phase difference between switching of the second arm circuit and switching of the fourth arm circuit in such a manner that power is transmitted from the secondary-side full bridge circuit to the primary-side full bridge circuit; and a current sensor measuring a current flowing through the secondary coil. The control part corrects a turn-off timing of the fifth arm in such a manner that a first integral value acquired from integrating a measured value from the current sensor for a first integral interval approaches zero, or corrects a turn-off timing of the seventh arm in such a manner that a second integral value acquired from integrating the measured value from the current sensor for a second integral interval approaches zero, wherein a first interval denotes an interval between a turn-off timing of the first arm and a turn-on timing of the seventh arm, the first integral interval denotes an interval acquired from delaying the first interval by a response delay period of time of the current sensor, a second interval denotes an interval between a turn-off timing of the third arm and a turn-on timing of the fifth arm, and the second integral interval denotes an interval acquired from delaying the second interval by the response delay period of time of the current sensor.

Other objects, features and advantages of the present invention will become more apparent from the following detailed description when read in conjunction with the accompanying drawings.

DETAILED DESCRIPTION OF THE EMBODIMENTS

In the above-mentioned power conversion apparatus in the related art, an interval (i.e., a dead time) may be present where both the arm at the high side and the arm at the low side arm are turned off. Thereby, a circulating current may be generated which does not contribute to power transmission between the primary-side full bridge circuit and the secondary-side full bridge circuit. Such a circulating current caused by a dead time will now be described using FIGS. 1 and 2.

Figure 1:
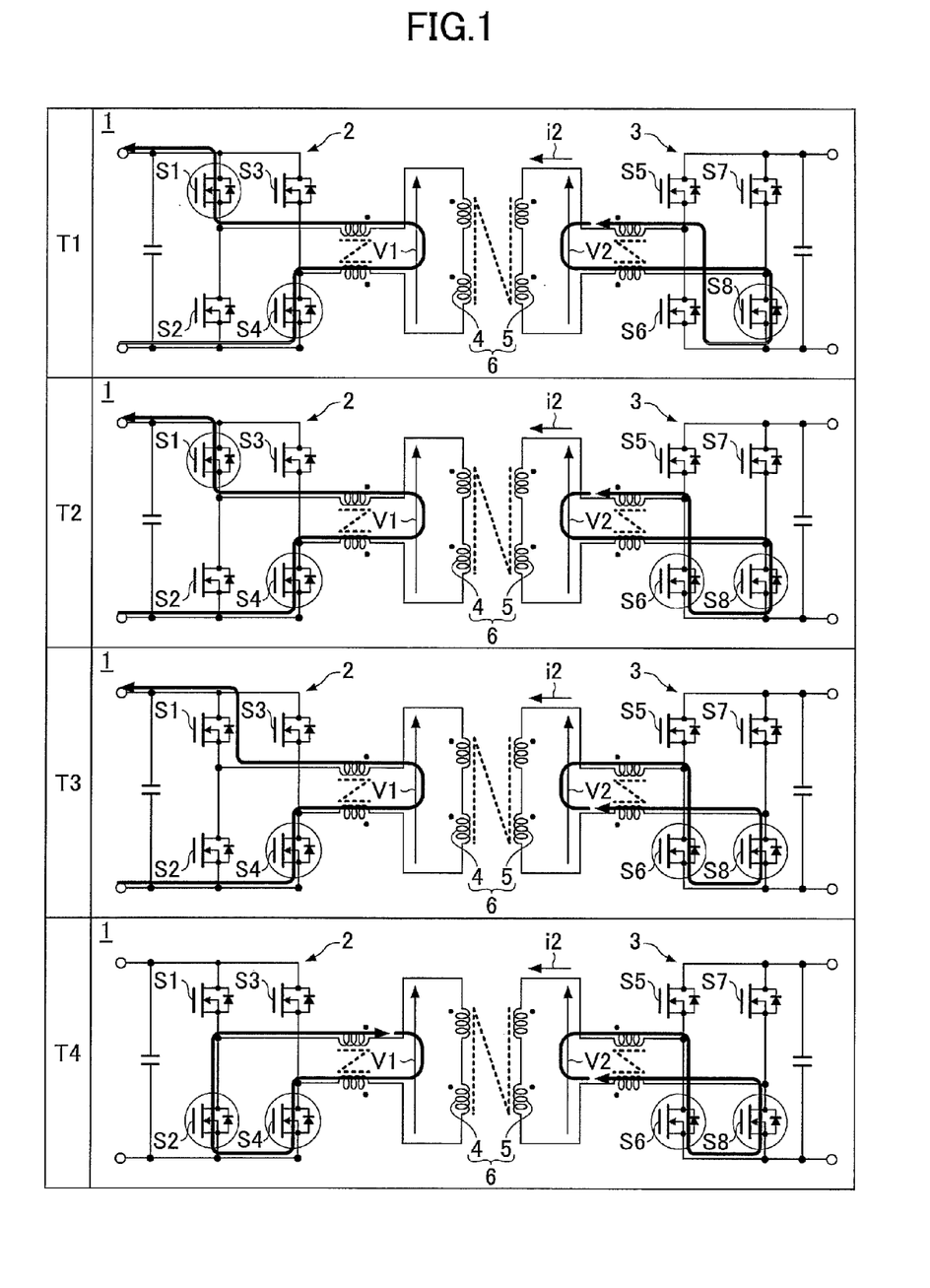
FIG. 1 illustrates one example of currents flowing through a power conversion apparatus at each interval.
Figure 2:
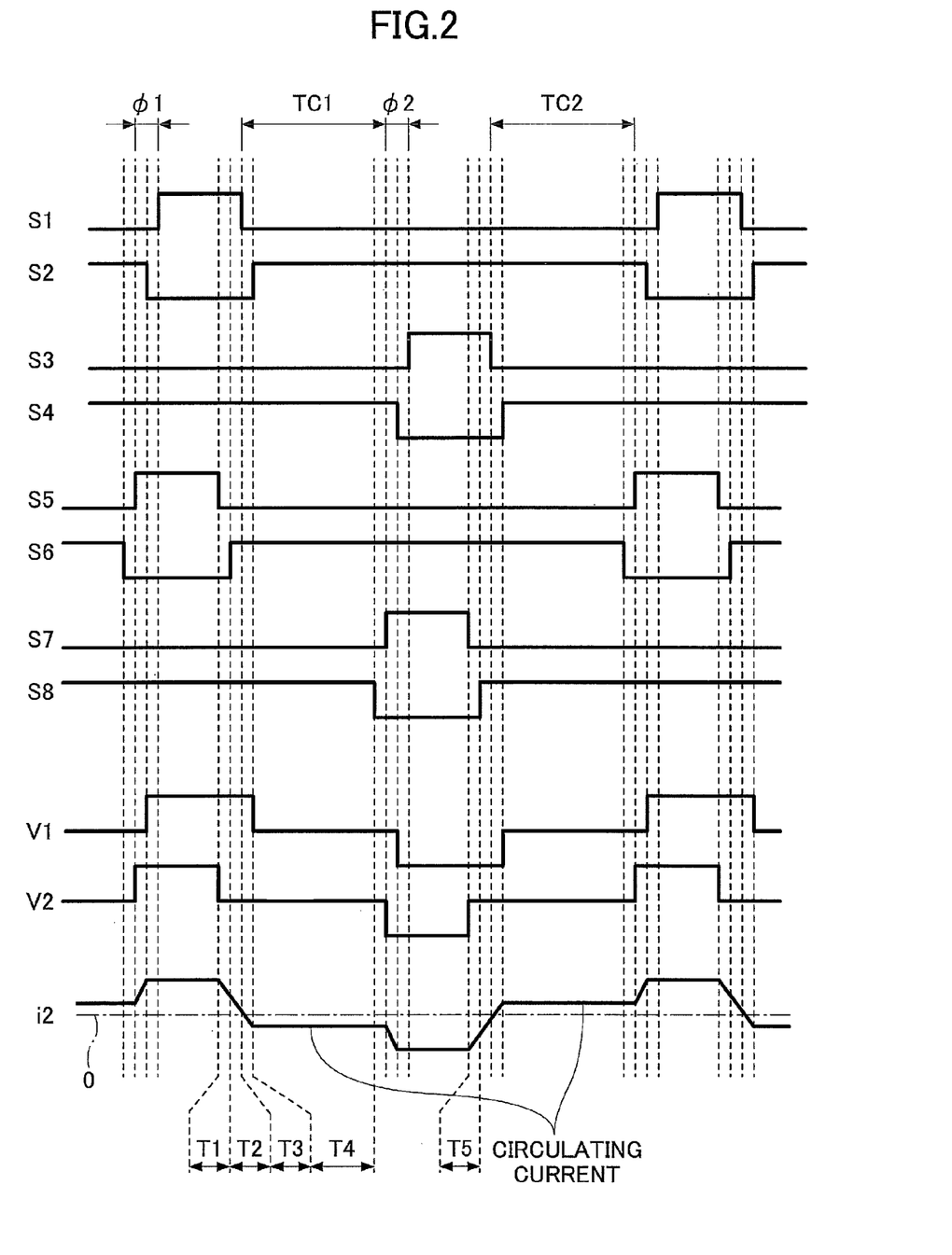
FIG. 2 is a timing chart illustrating one example of switching operations of each arm.

FIG. 1 illustrates one example of currents flowing through a power conversion apparatus 1 at respective intervals T1 to T4 shown in FIG. 2. In FIG. 1, the transistors enclosed by circles represent those in their turned-on states. FIG. 2 is a timing chart illustrating one example of switching operations of respective arms S1 to S8 shown in FIG. 1. In the turn-on/off waveforms of the respective arms S1 to S8 shown in FIG. 2, the high level represents the turned on state, whereas the low level represents the turned off state. V1 denotes a voltage generated across a primary coil 4 of a transformer 6, V2 denotes a voltage generated across a secondary coil 5 of the transformer 6, and i2 denotes a current flowing through the secondary coil 5.

As shown in FIG. 2, as a result of the arm S5 being turned off, the current i2 gradually reduces from an interval T1 through an interval T2. However, as a result of the arm S2 being turned on with a delay from turning off of the arm S1 (i.e., due to a presence of a dead time T3), a current in the same direction as that during the intervals T1 and T2 continues flowing through the primary coil 4 even during the dead time T3. Therefore, because of the current flowing through the primary coil 4 during the dead time T3 influences the secondary coil 5, the current value of the current i2 having been reducing from the interval T1 through the interval T2 crosses zero and becomes negative, as shown in FIG. 2. That is, the direction of the current i2 during the dead time T3 is reverse to that during the intervals T1 and T2.

Then, during an interval T4, all of the arms at the low side S2, S4, S6 and S8 are turned on, and therefore, a circulating current not contributing to the power transmission continues flowing in a circulating manner through the current paths shown in FIG. 1 in both the primary-side full bridge circuit 2 and the secondary-side full bridge circuit 3.

There may be another case where such a circulating current not contributing to the power transmission is generated. That is, due to a variation in the power source voltage applied to the primary-side full bridge circuit 2 or the secondary-side full bridge circuit 3 in the power conversion apparatus 1 described above using FIG. 1, the voltage ratio between the voltage V1 at the primary coil 4 and the voltage V2 at the secondary coil 5 may deviate from the turn ratio between the primary coil 4 and the secondary coil 5. Also in this case, in the same way as the above-mentioned case of the dead time, a circulating current not contributing to the power transmission may be generated. Such a circulating current caused by a variation in the power source voltage will now be described using FIG. 3.

Figure 3:
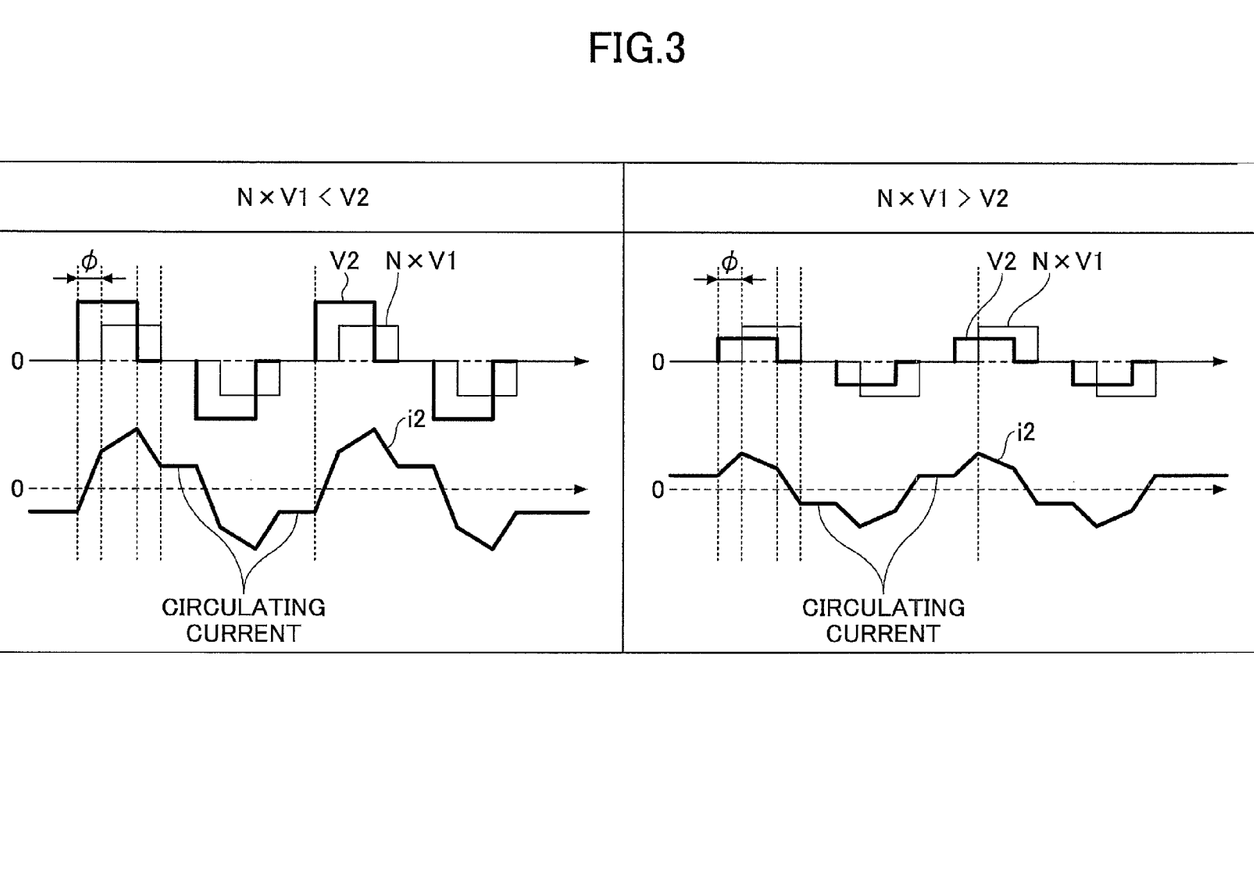
FIG. 3 illustrates one example of a circulating current caused by a variation in a power source voltage.

FIG. 3 illustrates one example of circulating currents caused by a variation in the power source voltage. It is assumed that the turn ratio between the primary coil 4 and the secondary coil 5 is 1:N. If the voltage V2 is higher than the voltage (N×V1) of a normal condition, the current i2 flows too much in comparison to the normal condition. If the voltage V2 is lower than the voltage (N×V1) of the normal condition, the current i2 flows too small in comparison to the normal condition. As a result, in any of these cases, the current i2 flowing during an interval during which the arms operate in such a manner as to cause the voltages V1 and V2 to become zero does not return to zero but continues flowing. In other words, the circulating current not contributing to the power transmission continues flowing in both the primary-side full bridge circuit 2 and the secondary-side full bridge circuit 3 in a circulating manner.

Such a circulating current may cause degradation in the conversion efficiency of the power conversion apparatus or an increase in the temperature of the power conversion apparatus. One idea can be such as to measure the circulating current by a current sensor and correct the switching timings in the respective arms in such a manner as to cause the measured current value of the circulating current to approach zero.

However, if the responsiveness of the current sensor is low, a measurement error included in the current value measured by the current sensor may be great, and thus, there is a possibility that a reduction in the circulating current with high precision cannot be achieved sufficiently.

An object of an embodiment is to provide a power conversion apparatus which can reduce a circulating current with high precision even with a current sensor having low responsiveness.

Below, the embodiment will be described using the accompanying drawings.

Figure 4:
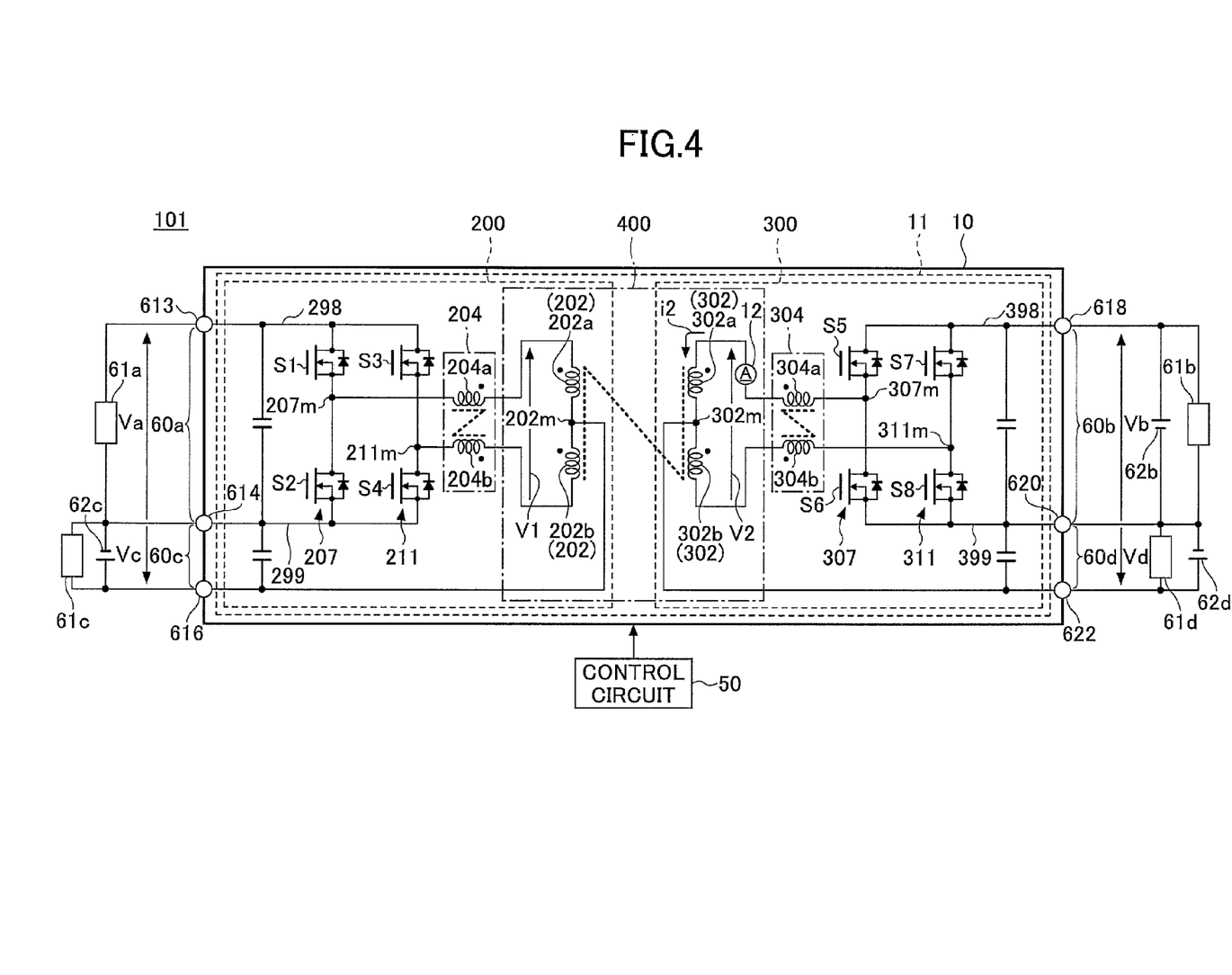
FIG. 4 illustrates a configuration of one example of a power conversion apparatus.

FIG. 4 illustrates one example of a configuration of a power supply apparatus 101 according to a first embodiment of a power conversion apparatus. The power supply apparatus 101 is, for example, one example of a vehicle power supply system that is mounted in a vehicle such as an automobile and distributes power to respective loads mounted in the vehicle. The power supply apparatus 101 includes, for example, a power supply circuit 10 and a control circuit 50.

The power supply circuit 10 is one example of a power conversion circuit having such a function that it includes two or more ports, any two ports are selected therefrom, and power conversion is carried out between the thus selected two ports. The power supply circuit 10 according to the first embodiment has, for example, four ports, and has a first port 60a, a second port 60c, a third port 60b, a fourth port 60d, and a converter 11.

The first port 60a is one example of a first terminal part of the power supply circuit 10 and, for example, a load 61a is connected thereto. The first port 60a is connected to a primary-side full bridge circuit 200, and is an input/output port between a primary-side positive bus 298 and a primary-side negative bus 299. The first port 60a includes terminals 613 and 614.

The second port 60c is one example of a second terminal part of the power supply circuit 10, and, for example, a battery 62c and a load 61c are connected thereto. The second port 60c is connected to the primary-side center tap 202m of a transformer 400, and is an input/output port between the primary-side negative bus 299 and the center tap 202m of a primary coil 202. The second port 60c includes terminals 614 and 616.

The third port 60b is one example of a third terminal part of the power supply circuit 10, and, for example, a battery 62b and a load 61b are connected thereto. The third port 60b is connected to a secondary-side full bridge circuit 300, and is an input/output port between a secondary-side positive bus 398 and a secondary-side negative bus 399. The third port 60b includes terminals 618 and 620.

The fourth port 60d is one example of a fourth terminal part of the power supply circuit 10, and, for example, a power source 62d and a load 61d are connected thereto. The fourth port 60d is connected to a secondary-side center tap 302m of the transformer 400, and is an input/output port between the secondary-side negative bus 399 and the center tap 302m of a secondary coil 302. The fourth port 60d includes terminals 620 and 622.

Port voltages Va, Vb, Vc and Vd are input voltages or output voltages of the first port 60a, the second port 60c, the third port 60b and the fourth port 60d, respectively.

The converter 11 is one example of a DC-DC converter that converts the voltage of direct-current power that is input to one port and outputs direct-current power acquired through the voltage conversion to another port. The converter 11 according to the first embodiment includes, for example, the transformer 400, the primary-side full bridge circuit 200 and the secondary-side full bridge circuit 300. The primary-side full bridge circuit 200 and the secondary-side full bridge circuit 300 are magnetically coupled by the transformer 400. The primary-side ports including the first port 60a and the second port 60c and the secondary-side ports including the third port 60b and the fourth port 60d are connected via the transformer 400.

The transformer 400 has the primary coil 202 and the secondary coil 302. As a result of the primary coil 202 and the secondary coil 302 being magnetically coupled with a coupling coefficient $k_T$, the transformer 400 functions as a transformer having the turn ratio 1:N between the primary coil 202 and the secondary coil 302. N is a positive number greater than 1. The transformer 400 is, for example, a center-tap-type transformer having the center taps 202m and 302m.

The primary coil 202 includes a primary-side first winding 202a, a primary-side second winding 202b, and the center tap 202m drawn out from a mid connected point between the primary-side first winding 202a and the primary-side second winding 202b. The number of turns of the primary-side first winding 202a is equal to the number of turns of the primary-side second winding 202b. The center tap 202m is connected to the terminal 616 at the high electric potential side of the second port 60c.

The secondary coil 302 includes a secondary-side first winding 302a, a secondary-side second winding 302b, and the center tap 302m drawn out from a mid connected point between the secondary-side first winding 302a and the secondary-side second winding 302b. The number of turns of the secondary-side first winding 302a is equal to the number of turns of the secondary-side second winding 302b. The center tap 302m is connected to the terminal 622 at the high electric potential side of the fourth port 60d.

The primary-side full bridge circuit 200 is at the primary side of the transformer 400. The primary-side full bridge circuit 200 includes the primary-side positive bus 298 connected to the terminal 613 at the high electric potential side of the first port 60a and the primary-side negative bus 299 connected to the terminal 614 at the low electric potential side of the first port 60a and the second port 60c.

Between the primary-side positive bus 298 and the primary-side negative bus 299, a first arm circuit 207 is connected in which an arm S1 connected on the high side of a mid point 207m and an arm S2 connected on the low side of the mid point 207m are connected in series. The mid point 207m is a primary-side first connected point between the arm S1 and the arm S2.

Between the primary-side positive bus 298 and the primary-side negative bus 299, also a second arm circuit 211 is connected in which an arm S3 connected on the high side of a mid point 211m and an arm S4 connected on the low side of the mid point 211m are connected in series. The second arm circuit 211 is connected to the first arm circuit 207 in parallel. The mid point 211m is a primary-side second connected point between the arm S3 and the arm S4.

The primary-side full bridge circuit 200 includes a bridge part connecting the mid point 207m of the first arm circuit 207 and the mid point 211m of the second arm circuit 211. The bridge part includes the primary coil 202 and primary-side magnetic coupling reactors 204. The primary coil 202 is inserted between the mid point 207m and the mid point 211m. The primary-side magnetic coupling reactors 204 include a primary-side first reactor 204a inserted between the mid point 207m and the primary coil 202 in series and a primary-side second reactor 204b inserted between the mid point 211m and the primary coil 202 in series. The primary-side first reactor 204a is magnetically coupled with the primary-side second reactor 204b with a coupling coefficient $k_1$.

The secondary-side full bridge circuit 300 is at the secondary side of the transformer 400. The secondary-side full bridge circuit 300 includes the secondary-side positive bus 398 connected to the terminal 618 at the high electric potential side of the third port 60b and the secondary-side negative bus 399 connected to the terminal 620 at the low electric potential side of the third port 60b and the fourth port 60d.

Between the secondary-side positive bus 398 and the secondary-side negative bus 399, a third arm circuit 307 is connected in which an arm S5 connected on the high side of a mid point 307m and an arm S6 connected on the low side of the mid point 307m are connected in series. The mid point 307m is a secondary-side first connected point between the arm S5 and the arm S6.

Between the secondary-side positive bus 398 and the secondary-side negative bus 399, also a fourth arm circuit 311 is connected in which an arm S7 connected on the high side of a mid point 311m and an arm S8 connected on the low side of the mid point 311m are connected in series. The fourth arm circuit 311 is connected to the third arm circuit 307 in parallel. The mid point 311m is a secondary-side second connected point between the arm S7 and the arm S8.

The secondary-side full bridge circuit 300 includes a bridge part connecting the mid point 307m of the third arm circuit 307 and the mid point 311m of the fourth arm circuit 311. The bridge part includes the secondary coil 302 and secondary-side magnetic coupling reactors 304. The secondary coil 302 is inserted between the mid point 307m and the mid point 311m. The secondary-side magnetic coupling reactors 304 include a secondary-side first reactor 304a inserted between the mid point 307m and the secondary coil 302 in series and a secondary-side second reactor 304b inserted between the mid point 311m and the secondary coil 302 in series. The secondary-side first reactor 304a is magnetically coupled with the secondary-side second reactor 304b with the coupling coefficient $k_1$.

The respective arms S1 to S8 are, for example, switching devices including N-channel MOSFETs and body diodes that are parasitic devices (parasitic diodes) of the MOSFETs, respectively. Diodes can be additionally connected in parallel to the arms, respectively.

Note that, at least one of the second port 60c and the fourth port 60d can be omitted. If the second port 60c is omitted, the center tap 202m and the primary-side magnetic coupling reactors 204 can be omitted. If the fourth port 60d is omitted, the center tap 302m and the secondary-side magnetic coupling reactors 304 can be omitted.

The control circuit 50 is one example of a control part controlling voltage conversion operation of the converter 11, generates control signals causing the converter 11 to carry out the voltage conversion operation, and outputs the control signals to the converter 11. The control circuit 50 according to the first embodiment outputs the control signals to turn on and turn off the respective arms S1 to S8 included in the primary-side full bridge circuit 200 and the secondary-side full bridge circuit 300. The control circuit 50 is, for example, a microcomputer including a Central Processing Unit (CPU), or an electronic circuit including the microcomputer.

The control circuit 50 is capable of changing the step-up ratios or the step-down ratios of both the primary-side full bridge circuit 200 and the secondary-side full bridge circuit 300 by controlling, for example, the duty ratios $D(=\delta/T)$.

The duty ratios D denote the ratios of the turn-on periods of time $\delta$ to the switching cycles T of the arm S1 and the arm S3 in the primary-side full bridge circuit 200, respectively, and also, denote the ratios of the turn-on periods of time $\delta$ to the switching cycles T of the arm S5 and the arm S7 in the secondary-side full bridge circuit 300, respectively. The switching cycles T of the arms included in the primary-side full bridge circuit 200 have periods of time equal to those of the switching cycles T of the arms included in the secondary-side full bridge circuit 300.

The control circuit 50 operates the arm S1 and the arm S3 in such a manner that the phase difference $\alpha$ therebetween is, in a normal operation condition, for example, 180 degrees ($\pi$), and also, operates the arm S5 and the arm S7 in such a manner that the phase difference $\beta$ therebetween is, in a normal operation condition, for example, 180 degrees ($\pi$).

The control circuit 50 controls phase differences φ (i.e., a first phase difference φ1 and a second phase difference φ2) in such a manner that power P is transmitted from the secondary-side full bridge circuit 300 to the primary-side full bridge circuit 200 via the transformer 400.

The first phase difference φ1 is the time difference between a switching timing of the first arm circuit 207 and a switching timing of the third arm circuit 307. The second phase difference φ2 is the time difference between a switching timing of the second arm circuit 211 and a switching timing of the fourth arm circuit 311.

As shown in FIG. 2, for example, the first phase difference φ1 is the phase difference between a turn-on timing of the arm S1 and a turn-on timing of the arm S5, and the second phase difference φ2 is the phase difference between a turn-on timing of the arm S3 and a turn-on timing of the arm S7.

Note that, it is possible that the first phase difference φ1 and the second phase difference φ2 are the phase difference between the voltage V1 across the primary coil 202 and the voltage V2 across the secondary coil 302. In this case, for example, it is possible that the first phase difference φ1 is the phase difference between a turn-on timing of the arm S5 and a turn-off timing of the arm S2, and the second phase difference φ2 is the phase difference between a turn-on timing of the arm S7 and a turn-off timing of the arm S4.

Note that a "turn-on timing" means a timing at which the arm is switched from its turned off state to its turned on state, and a "turn-off timing" means a timing at which the arm is switched from its turned on state to its turned off state.

The control circuit 50 according to the first embodiment is capable of transmitting power P from the secondary-side full bridge circuit 300 to the primary-side full bridge circuit 200 by controlling the phase difference φ1 to have a positive value and controlling the phase difference φ2 to have a positive value, and is capable of transmitting power P from the primary-side full bridge circuit 200 to the secondary-side full bridge circuit 300 by controlling the phase difference φ1 to have a negative value and controlling the phase difference φ2 to have a negative value. In other words, power P is transmitted from the full bridge circuit having the arm circuit where the arm at the high side is turned on earlier to the full bridge circuit having the arm circuit where the arm at the high side is turned on later, between the corresponding arm circuits of the primary-side full bridge circuit 200 and the secondary-side full bridge circuit 300. In the case of FIG. 2, power P is transmitted from the secondary-side full bridge circuit 300 to the primary-side full bridge circuit 200.

In a normal operation condition, the control circuit 50 carries out control such that the phase difference φ1 is equal to the phase difference φ2. However, it is also possible that the control circuit 50 carries out control such that the phase difference φ1 is different from the phase difference φ2 in such a range that the power P satisfies a required accuracy. That is, in a normal operation condition, control is carried out such that the phase difference φ1 has the same value as the phase difference φ2. However, it is also possible that control is carried out such that the phase difference φ1 has a different value from that of the phase difference φ2 if the power P satisfies the required accuracy.

The control circuit 50 carries out switching of each of the arms S1 to S8 included in the primary-side full bridge circuit 200 and the secondary-side full bridge circuit 300 by outputting the control signals to the converter 11 to control the duty ratios D to be instructed duty ratios Do, and also, control the phase differences φ to be instructed phase differences φo.

Figure 5:
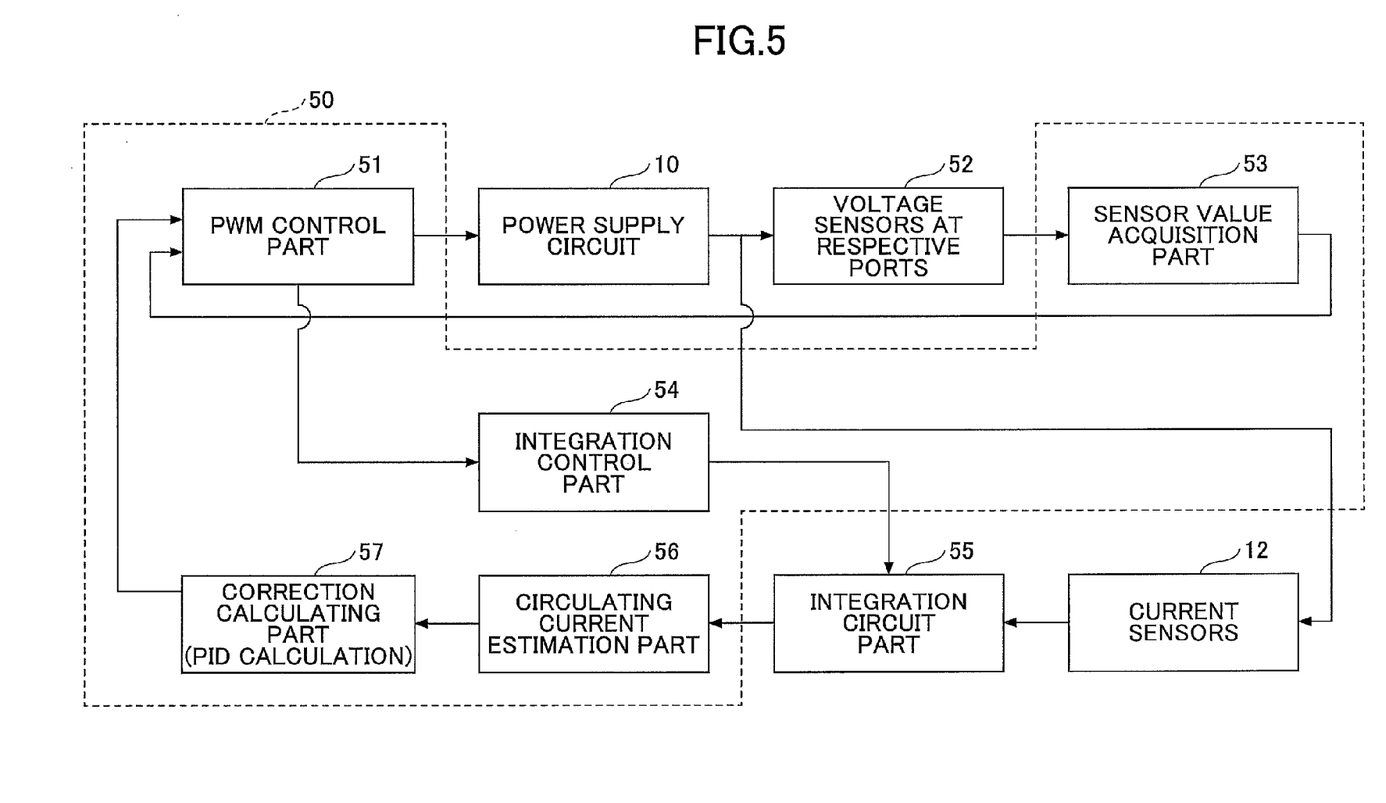
FIG. 5 is a block diagram illustrating one example of a control system controlling switching timings of each arm.

FIG. 5 is a block diagram illustrating one example of a control system controlling switching timings of the respective arms. In FIG. 5, the blocks outside the control circuit 50 (i.e., a power supply circuit 10, voltage sensors 52, a current sensor 12 and an integration circuit part 55) are implemented by hardware. The blocks inside the control circuit 50 are implemented by software. The respective blocks inside the control circuit 50 are implemented by, for example, a microcomputer(s) inside the control circuit 50.

The power supply apparatus 101 according to the first embodiment includes the power supply circuit 10 shown in FIG. 4 in detail, the voltage sensors 52, a sensor value acquisition part 53, and a PWM control part 51. The voltage sensors 52 measure the voltages at the respective ports 60a to 60d of the power supply circuit 10, and output the measured voltage values (i.e., voltage sensor values). The sensor value acquisition part 53 acquires the voltage sensor values. The PWM control part 51 outputs the control signals (i.e., PWM signals) to the converter 11 of the power supply circuit 10 to control the duty ratios D to be the instructed duty ratios Do and control the phase differences φ to be the instructed phase differences φo so that the voltage sensor values at the respective ports acquired by the sensor value acquisition part 53 are coincident with target voltage values that are set to the respective ports.

Also, the power supply apparatus 101 according to the first embodiment further includes the current sensor 12 and the integration circuit part 55. The current sensor 12 is one example of a current sensor measuring the current i2 flowing through the secondary coil 302 at the transmission side of power P when power P is transmitted from the secondary-side full bridge circuit 300 to the primary-side full bridge circuit 200 (see FIG. 4). The current sensor 12 outputs a measured value of the current i2. The integration circuit part 55 integrates the measured value of the current i2 (a current sensor value) for an integral interval designated by an integration control part 54, and outputs the resulting integral value. The integration circuit part 55 has a function of resetting the previous integration result at a timing of starting a current integral interval. The function of the integration circuit part 55 can be implemented by an analog circuit. Note that, the integration circuit part 55 can be implemented as a part of the control circuit 50, and, for example, the function of the integration circuit part 55 can be implemented by a microcomputer.

The control circuit 50 includes the integration control part 54, a circulating current estimation part 56 and a correction calculating part 57.

The integration control part 54 designates an interval for which the integration circuit part 55 integrates the measured value of the current i2 of the current sensor 12 (the measured value from the current sensor 12), based on the PWM signals that are output by the PWM control part 51 and the response delay period of time of the current sensor 12, and sends the designated interval to the integration circuit part 55. The PWM signals from the PWM control part 51 include information concerning the switching timings of the respective arms S1 to S8. The "response delay period of time" of the current sensor 12 depends on the time constant of the current sensor 12, and is a value that is previously set. The response delay period of time is, for example, previously measured and stored in a memory. Note that it is possible that, for example, the response delay period of time is equal to the "time constant" of the current sensor 12 itself.

The circulating current estimation part 56 acquires the integral value from the integration circuit part 55, and estimates the magnitude of the circulating current flowing through the secondary-side full bridge circuit 300 of the transmission side. The correction calculating part 57 calculates a correction amount of the switching timing of a specific one of the four arms S5 to S8 of the transmission side such as to reduce the magnitude of the circulating current thus estimated by the circulating current estimation part 56, and reflects the correction amount in the PWM signals that are output by the PWM control part 51.

Figure 6:
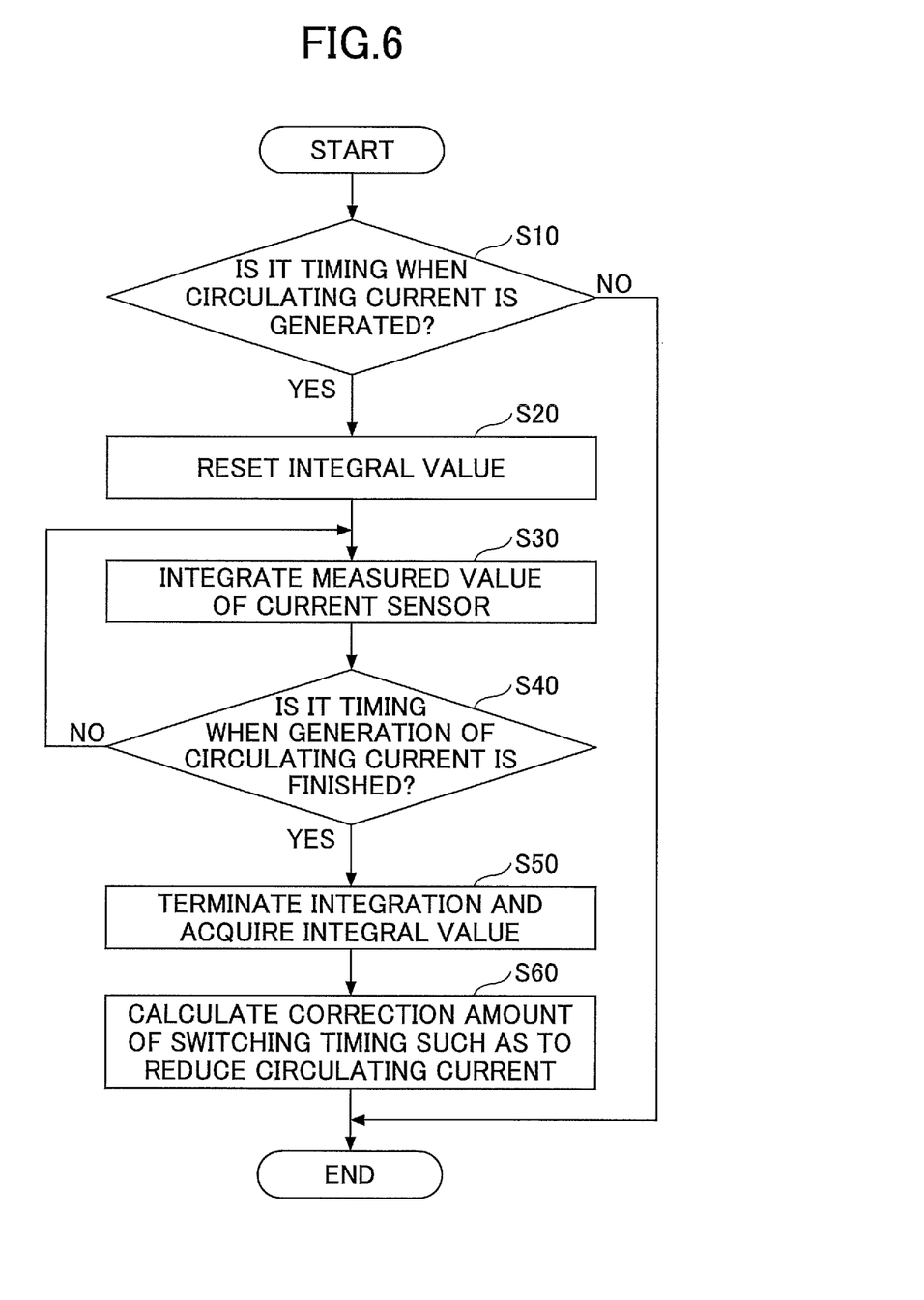
FIG. 6 is a flowchart illustrating one example of a flow of control operation for reducing the circulating current.

FIG. 6 is a flowchart illustrating one example of a flow of control operation of reducing the circulating current by the control circuit 50.

In step S10, the integration control part 54 determines whether it is a timing when a circulating current is generated, based on the PWM signals (the instructed values of switching timings of the respective arms) that are output by the PWM control part 51. In other words, the integration control part 54 determines whether it is a timing to start the interval for which the integration circuit part 55 integrates the measured value from the current sensor 12, based on the PWM signals that are output by the PWM control part 51.

As shown in FIG. 2, the interval during which the circulating current is generated is the first interval TC1 between the turn-off timing of the arm S1 and the turn-on timing of the arm S7, or the second interval TC2 between the turn-off timing of the arm S3 and the turn-on timing of the arm S5. The turn-off timing of the arm S1 or the turn-off timing of the arm S3 is a timing when generation of the circulating current is started.

If the integration control part 54 determines in step S10 that it is a timing when a circulating current is generated, the integration control part 54 outputs a signal of resetting the integral value held by the integration circuit part 55 to zero. Thus, the integral value acquired through integration by the integration circuit part 55 so far is reset to zero. Then, the integration control part 54 designates the timing acquired from delaying the turn-off timing of the arm S1 or the turn-off timing of the arm S3 by the response delay period of time of the current sensor 12, as an integration start timing for the measured value from the current sensor 12. Thereby, in step S30, the integration circuit part 55 starts integration of the measured value from the current sensor 12 at the integration start timing thus designated by the integration control part 54 (see FIG. 7).

In step S40, the integration control part 54 determines whether it is a timing when the generation of the circulating current is finished, based on the PWM signals (the instructed values of switching timings for the respective arms) that are output by the PWM control part 51. In other words, the integration control part 54 determines whether it is a timing of terminating the interval for which the integration circuit part 55 integrates the measured value from the current sensor 12, based on the PWM signals that are output by the PWM control part 51.

As shown in FIG. 2, the turn-on timing of the arm S7 or the turn-on timing of the arm S5 is a timing when the generation of the circulating current is finished. The turn-on timing of the arm S5 is the end time of the first interval TC1, and the turn-on timing of the arm S5 is the end time of the second interval TC2.

When the integration control part 54 determines in step S40 that it is a timing when the generation of the circulating current is finished, the integration control part 54 designates the timing acquired from delaying the turn-on timing of the arm S7 or the turn-on timing of the arm S5 by the response delay period of time of the current sensor 12, as the integration termination timing for the measured value from the current sensor 12. Thereby, in step S50, the integration circuit part 55 terminates the integration of the measured value from the current sensor 12 at the integration termination timing thus designated by the integration control part 54 (see FIG. 7).

Figure 7:
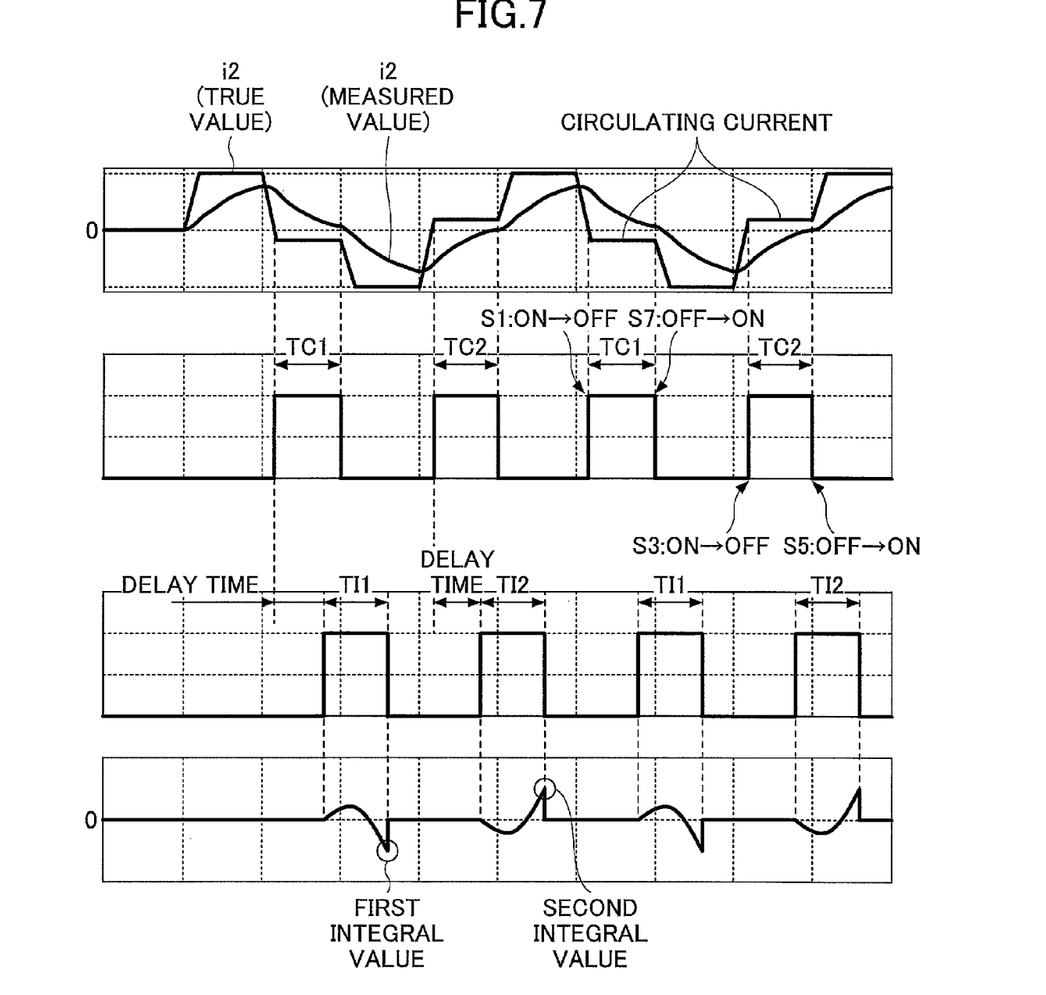
FIG. 7 is a timing chart illustrating one example of relationships among a current, integral intervals and integral values.

In other words, as shown in FIG. 7, the integration circuit part 55 generates a first integral value acquired through integration of the measured value from the current sensor 12 for the first integral interval TI1, or generates a second integral value acquired through integration of the measured value from the current sensor 12 for the second integral interval TI2. The first integral interval TI1 is acquired from delaying the first interval TC1 by the response delay period of time ("delay time" in FIG. 7) of the current sensor 12. The second integral interval TI2 is acquired from delaying the second interval TC2 by the response delay period of time of the current sensor 12.

In step S50, before the integral value is reset to zero by the integration control part 54, the circulating current estimation part 56 acquires the first integral value or the second integral value using an analog-to-digital (A-D) converter or so, and stores the thus acquired integral value in a memory as an index indicating the magnitude of the circulating current.

Figure 8:
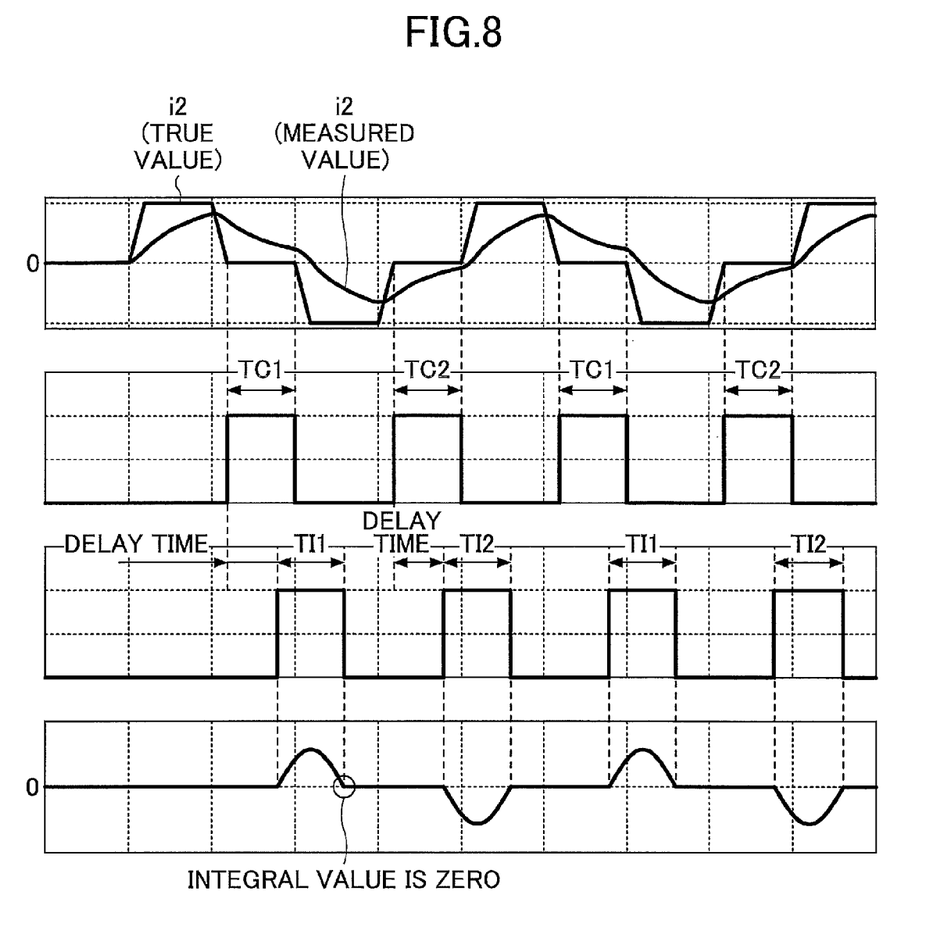
FIG. 8 is a timing chart illustrating one example of relationships among the current, the integral intervals and the integral values when no circulating current is generated.

For example, as shown in FIG. 8, if no circulating current is generated during the first interval TC1 or the second interval TC2 (i.e., if the current value of the circulating current during the first interval TC1 or the second interval TC2 is zero), the first integral value or the second integral value is zero. Thus, the first integral value or the second integral value can be used as an index indicating the magnitude of the circulating current.

In step S50, the correction calculating part 57 calculates an amount (a correction amount) to correct the switching timing of the specific one of the four arms S5 to S8 of the transmission side, through PID control or so, such that the circulating current estimated by the circulating current estimation part 56 is reduced (in other words, the current value of the circulating current approaches zero). The PWM control part 51 shifts the phase of the switching timing of the specific arm according to the correction amount calculated by the correction calculating part 57.

The correction calculating part 57 calculates, for example, the correction amount of the turn-off timing of the arm S5 such that the first integral value approaches zero. If the first integral value is negative as shown in FIG. 7, the correction calculating part 57 calculates such a correction amount as to delay the turn-off timing of the arm S5. Thus, the PWM control part 51 is capable of causing the first integral value to approach zero, and thus, is capable of causing the negative current value of the circulating current flowing during the first interval TC1 to approach zero with high precision as shown in FIG. 9.

Figure 9:
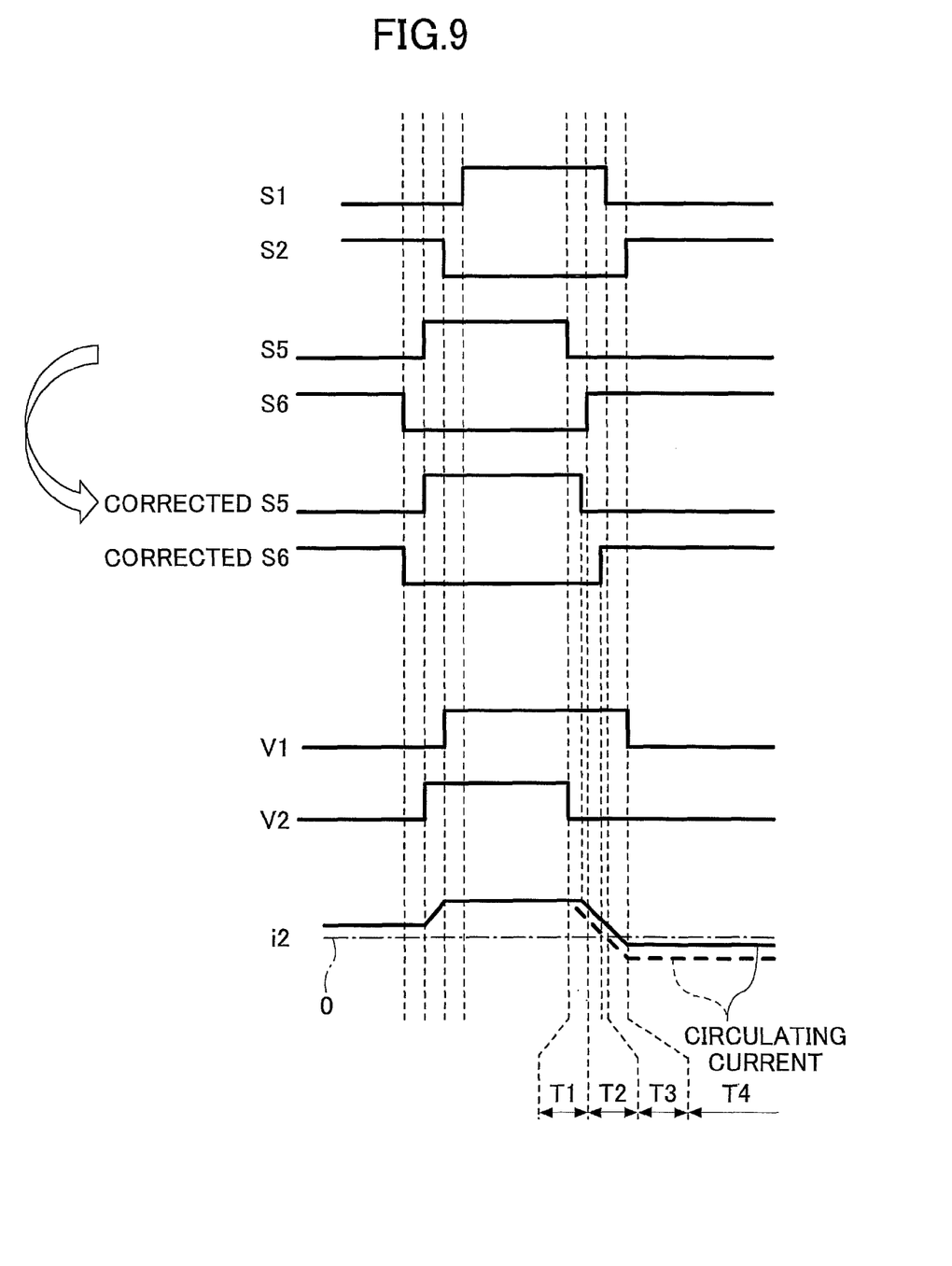
FIG. 9 is a timing chart illustrating one example of a state where the circulating current is reduced from a feedback correction of the switching timings.

In FIG. 9, the PWM control part 51 delays the turn-off timing of the arm S5 during the range of the interval T1. The PWM control part 51 does not delay the turn-on timing of the arm S2, and thus, the fall timing of the voltage V1 does not change. The slope of the change in the current i2 depends on the voltages V1 and V2 and the circuit inductance inside the power supply circuit 10, and so forth. FIG. 9 shows that the slope of the change in the current i2 does not change. Therefore, as shown in FIG. 9, it is possible to cause the negative circulating current to approach zero.

If the first integral value is positive, the correction calculating part 57 calculates such a correction amount as to advance the turn-off timing of the arm S5. Thus, the PWM control part 51 is capable of causing the first integral value to approach zero. Thus, the PWM control part 51 is capable of causing the positive current value of the circulating current flowing during the first interval TC1 to approach zero with high precision.

In the same way, the correction calculating part 57 calculates, for example, the correction amount of the turn-off timing of the arm S7 such that the second integral value approaches zero. If the second integral value is positive as shown in FIG. 7, the correction calculating part 57 calculates such a correction amount as to delay the turn-off timing of the arm S7. Thus, the PWM control part 51 is capable of causing the second integral value to approach zero. Thus, the PWM control part 51 is capable of causing the positive current value of the circulating current flowing during the second interval TC2 to approach zero with high precision. If the second integral value is negative, the correction calculating part 57 calculates such a correction amount to advance the turn-off timing of the arm S7. Thus, the PWM control part 51 is capable of causing the second integral value to approach zero. Thus, the PWM control part 51 is capable of causing the negative current value of the circulating current flowing during the second interval TC2 to approach zero with high precision.

Further, when correcting the turn-off timing of the arm S5 in such a manner that the first integral value approaches zero, it is possible that the correction calculating part 57 also calculates the correction amount of the turn-on timing of the arm S6. If the first integral value is negative as shown in FIG. 7, the correction calculating part 57 also calculates such a correction value as to delay the turn-on timing of the arm S6. Thus, the PWM control part 51 is capable of avoiding the dead time T1 from being excessively shortened otherwise occurring due to the delay in the turn-off timing of the arm S5, as a result of, as shown in FIG. 9, together with the change in the turn-off timing of the arm S5, the turn-on timing of the arm S6 thus being changed. If the first integral value is positive, the correction calculating part 57 also calculates such a correction amount as to advance the turn-on timing of the arm S6. Thus, the PWM control part 51 is capable of avoiding the dead time T1 from being excessively elongated otherwise occurring due to the advance in the turn-off timing of the arm S5, as a result of, together with the change in the turn-off timing of the arm S5, the turn-on timing of the arm S6 thus being changed.

In the same way, when correcting the turn-off timing of the arm S7 so that the second integral value approaches zero, it is possible that the correction calculating part 57 also calculates the correction amount of the turn-on timing of the arm S8. If the second integral value is positive as shown in FIG. 7, the correction calculating part 57 also calculates such a correction value as to delay the turn-on timing of the arm S8. Thus, the PWM control part 51 is capable of avoiding the dead time T5 (see FIG. 2) from being excessively shortened otherwise occurring due to the delay in the turn-off timing of the arm S7, as a result of, together with the change in the turn-off timing of the arm S7, the turn-on timing of the arm S8 thus being changed. If the second integral value is negative, the correction calculating part 57 also calculates such a correction amount as to advance the turn-on timing of the arm S8. Thus, the PWM control part 51 is capable of avoiding the dead time T5 from being excessively elongated otherwise occurring due to the advance in the turn-off timing of the arm S7, as a result of, together with the change in the turn-off timing of the arm S7, the turn-on timing of the arm S8 thus being changed.

The correction calculating part 57 calculates the correction amount $\Delta Do$ of the instructed duty ratio Do of each arm, for example, as the correction amount of the switching timing of the arm.

The correction calculating part 57 acquires, for example, a value acquired from multiplying the absolute value of the first integral value with a predetermined proportional gain as a correction amount $\Delta Do5$ of the instructed duty ratio Do5 of the arm S5. The PWM control part 21 acquires a value acquired from adding the instructed duty ratio Do5 of the arm S5 with the correction amount $\Delta Do5$ as a new instructed duty ratio Do5, and thus, the PWM control part 21 is capable of delaying the turn-off timing of the arm S5 as shown in, FIG. 9.

In the same way, the correction calculating part 57 acquires, for example, a value acquired from multiplying the absolute value of the second integral value with a predetermined proportional gain as a correction amount $\Delta Do7$ of the instructed duty ratio Do7 of the arm S7. The PWM control part 21 acquires a value acquired from subtracting the correction amount $\Delta Do7$ from the instructed duty ratio Do7 of the arm S7 as a new instructed duty ratio Do7, and thus, the PWM control part 21 is capable of advancing the turn-off timing of the arm S7.

Thus, the power conversion apparatus has been described in the embodiment. However, the present invention is not limited to such a specific embodiment. Various modifications and improvements, such as a combination or replacement with a part or all of another embodiment, can be made without departing from the claimed invention.

For example, each arm is not limited to a MOSFET, and can be another semiconductor device that carries out turning on/off operations. For example, each arm can be a voltage-controlled-type power device using an insulated gate such as an IGBT, a MOSFET, or so, or a bipolar transistor.

Further, in the above description, it is possible that the primary side is defined as the secondary side, and the secondary side is defined as the primary side.

According to the first embodiment, an interval during which the circulating current can be generated is the first interval or the second interval. Thus, the first integral value acquired from integrating the measured value from the current sensor for the first integral interval, or the second integral value acquired from integrating the measured value from the current sensor for the second integral interval can be used as an index indicating the magnitude of the circulating current. Therefore, even if the responsiveness of the current sensor is low, it is possible to reduce the circulating current with high precision by correcting the turn-off timing of the fifth arm in such a manner that the first integral value approaches zero, or correcting the turn-off timing of the seventh arm in such a manner that the second integral value approaches zero, as described above.

The present application is based on and claims the benefit of priority of Japanese Priority Application No. 2015-005961, filed on Jan. 15, 2015, the entire contents of which are hereby incorporated herein by reference.

What is claimed is:

1. A power conversion apparatus comprising:
    a transformer having a primary coil and a secondary coil;
    a primary-side full bridge circuit having a first arm circuit where a first arm at a high side and a second arm at a low side are connected in series and a second arm circuit where a third arm at a high side and a fourth arm at a low side are connected in series, the primary coil being included in a bridge part that connects a connected point at which the first arm and the second arm are connected with a connected point at which the third arm and the fourth arm are connected;

a secondary-side full bridge circuit having a third arm circuit where a fifth arm at a high side and a sixth arm at a low side are connected in series and a fourth arm circuit where a seventh arm at a high side and an eighth arm at a low side are connected in series, the secondary coil being included in a bridge part that connects a connected point at which the fifth arm and the sixth arm are connected with a connected point at which the seventh arm and the eighth arm are connected;

a control part controlling a first phase difference between switching of the first arm circuit and switching of the third arm circuit and a second phase difference between switching of the second arm circuit and switching of the fourth arm circuit in such a manner that power is transmitted from the secondary-side full bridge circuit to the primary-side full bridge circuit; and a current sensor measuring a current flowing through the secondary coil, wherein the control part corrects a turn-off timing of the fifth arm in such a manner that a first integral value acquired from integrating a measured value from the current sensor for a first integral interval approaches zero, or corrects a turn-off timing of the seventh arm in such a manner that a second integral value acquired from integrating the measured value from the current sensor for a second integral interval approaches zero, wherein a first interval denotes an interval between a turn-off timing of the first arm and a turn-on timing of the seventh arm, the first integral interval denotes an interval acquired from delaying the first interval by a response delay period of time of the current sensor, a second interval denotes an interval between a turn-off timing of the third arm and a turn-on timing of the fifth arm, and the second integral interval denotes an interval acquired from delaying the second interval by the response delay period of time of the current sensor.

2. The power conversion apparatus as claimed in claim 1, wherein when correcting the turn-off timing of the fifth arm in such a manner that the first integral value approaches zero, the control part also correct the turn-on timing of the sixth arm, and, when correcting the turn-off timing of the seventh arm in such a manner that the second integral value approaches zero, also correct the turn-on timing of the eighth arm.

3. The power conversion apparatus as claimed in claim 2, wherein the first arm circuit and the second arm circuit are connected in parallel, and the third arm circuit and the fourth arm circuit are connected in parallel.

4. The power conversion apparatus as claimed in claim 3, wherein each of the first arm, the second arm, the third arm, the fourth arm, the fifth arm, the sixth arm, the seventh arm and the eighth arm includes a MOSFET or an IGBT.

5. The power conversion apparatus as claimed in claim 2, wherein each of the first arm, the second arm, the third arm, the fourth arm, the fifth arm, the sixth arm, the seventh arm and the eighth arm includes a MOSFET or an IGBT.

6. The power conversion apparatus as claimed in claim 1, wherein the first arm circuit and the second arm circuit are connected in parallel, and the third arm circuit and the fourth arm circuit are connected in parallel.

7. The power conversion apparatus as claimed in claim 6, wherein each of the first arm, the second arm, the third arm, the fourth arm, the fifth arm, the sixth arm, the seventh arm and the eighth arm includes a MOSFET or an IGBT.

8. The power conversion apparatus as claimed in claim 1, wherein each of the first arm, the second arm, the third arm, the fourth arm, the fifth arm, the sixth arm, the seventh arm and the eighth arm includes a MOSFET or an IGBT.

9. A power conversion apparatus comprising:

a transformer having a primary coil and a secondary coil;

a primary-side full bridge circuit having a first arm circuit where a first arm at a high side and a second arm at a low side are connected in series and a second arm circuit where a third arm at a high side and a fourth arm at a low side are connected in series, the primary coil being included in a bridge part that connects a connected point at which the first arm and the second arm are connected with a connected point at which the third arm and the fourth arm are connected;

a secondary-side full bridge circuit having a third arm circuit where a fifth arm at a high side and a sixth arm at a low side are connected in series and a fourth arm circuit where a seventh arm at a high side and an eighth arm at a low side are connected in series, the secondary coil being included in a bridge part that connects a connected point at which the fifth arm and the sixth arm are connected with a connected point at which the seventh arm and the eighth arm are connected; and a control part controlling a first phase difference between switching of the first arm circuit and switching of the third arm circuit and a second phase difference between switching of the second arm circuit and switching of the fourth arm circuit in such a manner that power is transmitted from the secondary-side full bridge circuit to the primary-side full bridge circuit, wherein the control part controls operation of at least one of the first arm, the second arm, the third arm, the fourth arm, the fifth arm, the sixth arm, the seventh arm and the eighth arm in such a manner as to reduce a circulating current generated in the power conversion apparatus and not contributing to power transmission from the secondary-side full bridge circuit to the primary-side full bridge circuit in a feedback manner.

10. The power conversion apparatus as claimed in claim 9, wherein if the circulating current value is negative, the control circuit delays a turn-off timing of the fifth arm so as to delay a timing when a fall of the circulating current value starts by such an amount that the fall stops when the circulating current value crosses zero, and if the circulating current value is positive, the control circuit advances the turn-off timing of the fifth arm so as to advance the timing when the fall of the circulating current value starts by such an amount that the fall stops when the circulating current value crosses zero, or if the circulating current value is positive, the control circuit delays a turn-off timing of the seventh arm so as to delay a timing when a rise of the circulating current value starts by such an amount that the rise stops when the circulating current value crosses zero, and if the circulating current value is negative, the control circuit advances the turn-off timing of the seventh arm so as to advance the timing when the rise of the circulating current value starts by such an amount that the rise stops when the circulating current value crosses zero.

11. The power conversion apparatus as claimed in claim 10, wherein
the first arm circuit and the second arm circuit are connected in parallel, and the third arm circuit and the fourth arm circuit are connected in parallel.

12. The power conversion apparatus as claimed in claim 11, wherein
each of the first arm, the second arm, the third arm, the fourth arm, the fifth arm, the sixth arm, the seventh arm and the eighth arm includes a MOSFET or an IGBT.

13. The power conversion apparatus as claimed in claim 10, wherein
each of the first arm, the second arm, the third arm, the fourth arm, the fifth arm, the sixth arm, the seventh arm and the eighth arm includes a MOSFET or an IGBT.

14. The power conversion apparatus as claimed in claim 9, wherein
the first arm circuit and the second arm circuit are connected in parallel, and the third arm circuit and the fourth arm circuit are connected in parallel.

15. The power conversion apparatus as claimed in claim 14, wherein
each of the first arm, the second arm, the third arm, the fourth arm, the fifth arm, the sixth arm, the seventh arm and the eighth arm includes a MOSFET or an IGBT.

16. The power conversion apparatus as claimed in claim 9, wherein
each of the first arm, the second arm, the third arm, the fourth arm, the fifth arm, the sixth arm, the seventh arm and the eighth arm includes a MOSFET or an IGBT.

* * * * *